No. 685,342. Patented Oct. 29, 1901.
E. T. NAYLOR.
BROILER.
(Application filed May 24, 1901.)
(No Model.)
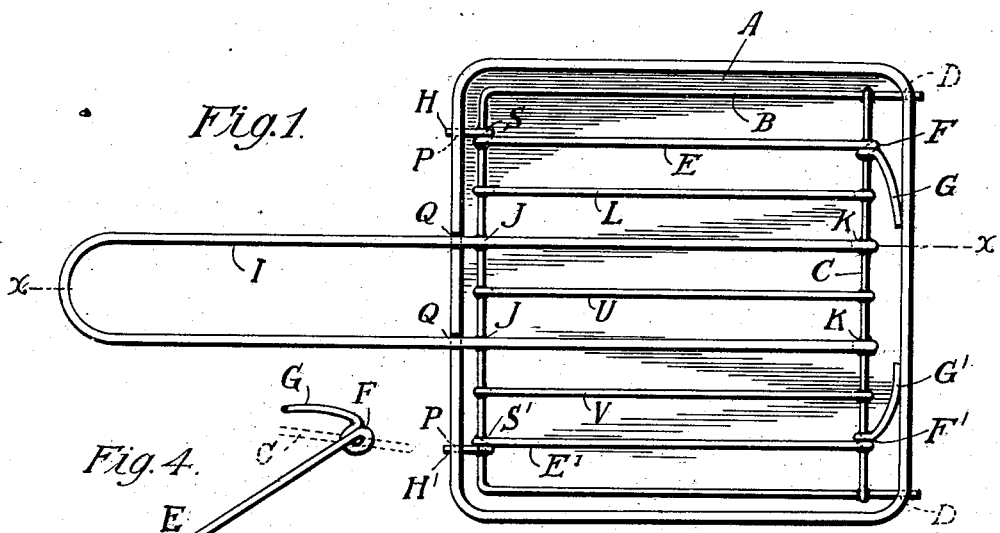
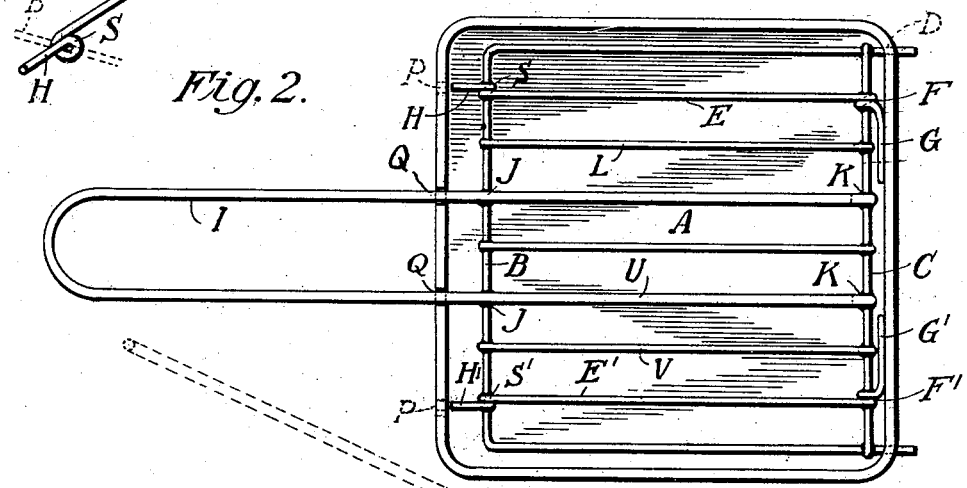
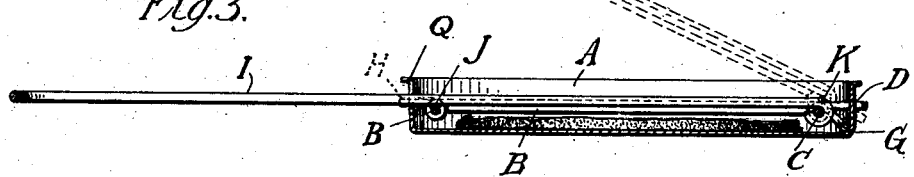
Witnesses.
Inventor.
Esau T. Naylor.
By his Atty's

UNITED STATES PATENT OFFICE.

ESAU T. NAYLOR, OF MELROSE PARK, ILLINOIS.

BROILER.

SPECIFICATION forming part of Letters Patent No. 685,342, dated October 29, 1901.

Application filed May 24, 1901. Serial No. 61,690. (No model.)

*To all whom it may concern:*

Be it known that I, ESAU T. NAYLOR, a citizen of the United States, residing at Melrose Park, in the county of Cook and State of Illinois, have invented a new and useful Improvement in Broilers, of which the following is a specification.

This invention relates to improvements in broilers; and the object of the improvement is the construction of a device which is especially adapted for broiling steaks, toasting bread, &c., and which is particularly designed for use over gas, gasolene, or oil stoves. The device is also well adapted for use as a warming-pan or for heating irons, cooking milk, keeping victuals warm, &c.

The invention will be understood more fully from the detailed description hereinafter presented, reference being had to the accompanying drawings, in which—

Figure 1 represents a plan view of the device, showing the handle and skeleton lid in locked position. Fig. 2 represents a plan view of the device, showing the handle and skeleton lid in an unlocked position. Fig. 3 represents a cross-section taken on line X X of Fig. 1, showing handle and skeleton lid in raised position; and Fig. 4 represents a perspective view of a cross-wire, showing the spring extension, the loops, and projection.

Similar letters refer to similar parts throughout the several views.

A represents a pan of suitable size, constructed of tin or other suitable material, preferably made in the form as shown in Fig. 3.

B represents the U-shaped frame forming the skeleton lid, to which is soldered or otherwise rigidly secured the wire brace C. The ends of the frame B engage the holes D in the rim of the pan A.

E and E' represent cross-wires, one end of which is looped around the wire brace C, as shown at F and F', terminating in the spring extensions G and G'. These extensions rest against the rim of the pan A and normally hold the skeleton lid in the position as illustrated in Fig. 1. The opposite ends of the cross-wires E and E' are looped around the frame B and soldered thereto at the points S and S' and terminate in the projections H and H', which enter the openings P P in the rim of the pan A. The projections H and H' are guided in place by means of the handle I engaging the slots Q Q in the pan.

I represents the handle to the device. It is U-shaped, composed of wire, and soldered to the frame B at the points J J and looped around the wire brace C at the points K K.

L represents a wire brace, the ends of which are looped around and soldered to the frame B and the wire brace C, respectively. U and V are similar wires and are similarly attached as the wire brace L.

In operation when it is desired to place victuals in the broiler the handle is firmly grasped in the hand and the skeleton lid pushed against the end of the pan A, causing the spring extensions G and G' to yield, as shown in Fig. 2, thus allowing the projections H and H' to come out of engagement with the holes P. Then by raising the handles up, as illustrated in Fig. 3, the steaks or other articles to be broiled or toasted are placed in the bottom of the pan A, the handle is then adjusted in the position as shown in Fig. 1, and the broiler is ready to be placed over the fire, as desired.

It is evident that slight changes may be made in the form and arrangement of the several parts herein described without departing from the spirit and scope of my invention, and hence I do not wish to be limited to the exact construction herein set forth; but, Having described my invention, what I desire to claim as new and secure by Letters Patent is—

In a broiler the combination with a pan, provided with openings on opposite sides thereof, and a skeleton lid provided with projections on opposite sides thereof adapted to enter the openings of the pan, the projections on one side of the lid being longer than those on the opposite side, and springs at the side of the lid having the longer projections, by which the lid may be secured to the pan.

ESAU T. NAYLOR.

Witnesses:
K. SCHAAF,
CHAS. M. RICHTER.